United States Patent
Otero et al.

(10) Patent No.: US 10,557,354 B2
(45) Date of Patent: Feb. 11, 2020

(54) GAS TURBINE ENGINE AIRFOIL CROSSOVER AND PEDESTAL RIB COOLING ARRANGEMENT

(71) Applicant: United Technologies Corporation, Farmington, CT (US)

(72) Inventors: Edwin Otero, Southington, CT (US); Kyle C. Lana, Kensington, CT (US)

(73) Assignee: United Technologies Corporation, Farmington, CT (US)

( * ) Notice: Subject to any disclaimer, the term of this patent is extended or adjusted under 35 U.S.C. 154(b) by 520 days.

(21) Appl. No.: 14/914,084

(22) PCT Filed: Aug. 13, 2014

(86) PCT No.: PCT/US2014/050876
§ 371 (c)(1),
(2) Date: Feb. 24, 2016

(87) PCT Pub. No.: WO2015/031057
PCT Pub. Date: Mar. 5, 2015

(65) Prior Publication Data
US 2016/0201477 A1    Jul. 14, 2016

Related U.S. Application Data

(60) Provisional application No. 61/870,910, filed on Aug. 28, 2013.

(51) Int. Cl.
*F01D 5/18* (2006.01)
*F23R 3/00* (2006.01)
(Continued)

(52) U.S. Cl.
CPC ............. *F01D 5/187* (2013.01); *F01D 5/147* (2013.01); *F01D 5/18* (2013.01); *F01D 5/182* (2013.01);
(Continued)

(58) Field of Classification Search
CPC . F01D 5/147; F01D 5/18; F01D 5/182; F01D 5/185; F01D 5/186; F01D 5/187;
(Continued)

(56) References Cited

U.S. PATENT DOCUMENTS 4,180,373 A    12/1979  Moore et al.
4,278,400 A *  7/1981   Yamarik ................. F01D 5/187
                                                           415/115

(Continued)

FOREIGN PATENT DOCUMENTS

EP    1035302    9/2000
EP    1327747    7/2003

OTHER PUBLICATIONS

International Preliminary Report on Patentability for PCT Application No. PCT/US2014/050876, dated Mar. 10, 2016.
(Continued)

*Primary Examiner* — Scott J Walthour
(74) *Attorney, Agent, or Firm* — Carlson, Gaskey & Olds, P.C.

(57) ABSTRACT

A gas turbine engine component includes spaced apart walls that provide a cooling passage that extends in a first direction. A cross-over rib joins the walls and extends along the first direction. The cross-over rib has holes that extend in a second direction transverse to the first direction. A row of at least one pedestal joins the walls and extends along the first direction. The row and the cross-over rib overlap one another in the second direction.

12 Claims, 4 Drawing Sheets

(51) Int. Cl.
*F01D 9/04* (2006.01)
*F01D 11/08* (2006.01)
*F01D 25/30* (2006.01)
*F01D 25/12* (2006.01)
*F01D 5/14* (2006.01)

(52) U.S. Cl.
CPC ............ *F01D 5/185* (2013.01); *F01D 5/186* (2013.01); *F01D 9/041* (2013.01); *F01D 11/08* (2013.01); *F01D 25/12* (2013.01); *F01D 25/30* (2013.01); *F23R 3/002* (2013.01); *F05D 2220/32* (2013.01); *F05D 2240/126* (2013.01); *F05D 2240/304* (2013.01); *F05D 2240/35* (2013.01); *F05D 2260/202* (2013.01); *F05D 2260/2212* (2013.01); *F05D 2260/2214* (2013.01); *F05D 2260/22141* (2013.01); *Y02T 50/671* (2013.01); *Y02T 50/676* (2013.01)

(58) Field of Classification Search
CPC .......... F01D 9/041; F01D 11/08; F01D 25/08; F01D 25/12; F01D 25/30; F05D 2240/11; F05D 2240/126; F05D 2240/15; F05D 2240/304; F05D 2240/35; F05D 2240/81; F05D 2260/20; F05D 2260/202; F05D 2260/2212; F05D 2260/2214; F05D 2260/22141; F23R 3/002; F23R 2900/03043; F23R 2900/03045; Y02T 50/676
See application file for complete search history.

(56) References Cited

U.S. PATENT DOCUMENTS

| | | | |
|---|---|---|---|
| 5,337,805 A * | 8/1994 | Green | F01D 5/187 164/122.1 |
| 5,975,851 A | 11/1999 | Liang | |
| 6,179,565 B1 | 1/2001 | Palumbo et al. | |
| 6,234,754 B1 | 5/2001 | Zelesky et al. | |
| 7,175,386 B2 | 2/2007 | Cherolis et al. | |
| 7,258,528 B2 | 8/2007 | Trindade et al. | |
| 7,607,891 B2 | 10/2009 | Cherolis et al. | |
| 7,713,027 B2 | 5/2010 | Cherolis et al. | |
| 7,780,414 B1 | 8/2010 | Liang | |
| 2001/0012484 A1 | 8/2001 | Beeck et al. | |
| 2003/0133795 A1 | 7/2003 | Manning et al. | |
| 2005/0169754 A1 * | 8/2005 | Surace | F01D 5/16 416/97 R |
| 2005/0244264 A1 | 11/2005 | Jacks et al. | |
| 2008/0050244 A1 | 2/2008 | Cherolis et al. | |

OTHER PUBLICATIONS

International Search Report and Written Opinion for PCT/US2014/050876 dated Nov. 20, 2014.
Extended European Search Report for European Application No. 14839111.3 dated Nov. 11, 2016.

* cited by examiner

_US 10,557,354 B2_

GAS TURBINE ENGINE AIRFOIL CROSSOVER AND PEDESTAL RIB COOLING ARRANGEMENT

CROSS-REFERENCE TO RELATED APPLICATIONS

This application claims priority to U.S. Provisional Application No. 61/870,910, which was filed on Aug. 28, 2013.

BACKGROUND

This disclosure relates to a gas turbine engine airfoil. More particularly, the disclosure relates to a cooling arrangement within a cooling passage of the airfoil.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Many blades and vanes, blade outer air seals, turbine platforms, and other components include internal cooling passages having turns that provide a serpentine shape, which create undesired pressure losses. Some of the cooling passages may include portions having turbulence promoters that enhance the cooling effects of the cooling flow through the cooling passage, in particular, at the trailing edge portion of the airfoil. Typical designs carry either a full rib of crossovers or pedestals extending radially within the trailing edge portion.

SUMMARY

In one exemplary embodiment, a gas turbine engine component includes spaced apart walls that provide a cooling passage that extends in a first direction. A cross-over rib joins the walls and extends along the first direction. The cross-over rib has holes that extend in a second direction transverse to the first direction. A row of at least one pedestal joins the walls and extends along the first direction. The row and the cross-over rib overlap one another in the second direction.

In a further embodiment of the above, spaced apart walls are provided by pressure and suction walls that form an airfoil. The first direction corresponds to a radial direction along which the airfoil extends from a platform to a tip. The second direction corresponds to a chord-wise direction.

In a further embodiment of any of the above, the row is arranged near the tip, and the cross-over is arranged near the platform.

In a further embodiment of any of the above, the airfoil includes a trailing edge portion. The cross-over rib and the row are arranged in the trailing edge portion.

In a further embodiment of any of the above, the cooling passage includes first and second cooling passageways. The cross-over rib is arranged between the first and second cooling passageways and the holes fluidly connect the first and second passageways.

In a further embodiment of any of the above, the cooling passage is tapered along the first direction from a wide end to a narrow end.

In a further embodiment of any of the above, the row is arranged near the narrow end, and the cross-over rib is arranged near the wide end.

In a further embodiment of any of the above, the cross-over rib and the row are aligned with one another in the second direction to provide a non-contiguous rib in the first direction.

In a further embodiment of any of the above, multiple cross-over ribs are spaced apart from one another in the second direction. The row is aligned in the second direction between the multiple cross-over ribs and spaced apart in the first direction.

In a further embodiment of any of the above, multiple rows are spaced apart from one another in the second direction. The cross-over rib is aligned in the second direction between the multiple rows and spaced apart in the first direction.

In a further embodiment of any of the above, the component is one of an airfoil, a blade outer air seal, a vane, a blade, a platform, a combustor liner and an exhaust liner.

In another exemplary embodiment, a gas turbine engine component includes spaced apart walls that provide a cooling passage that extends in a first direction. A cross-over rib joins the walls and extends along the first direction. The cross-over rib has holes that extend in a second direction transverse to the first direction. A row of at least one pedestal joins the walls and extends along the first direction. The row and the cross-over rib generally are aligned with another in the second direction to provide a rib in the first direction.

In a further embodiment of the above, spaced apart walls are provided by pressure and suction walls that form an airfoil. The first direction corresponds to a radial direction along which the airfoil extends from a platform to a tip. The second direction corresponds to a chord-wise direction.

In a further embodiment of any of the above, the row is arranged near the tip, and the cross-over rib is arranged near the platform.

In a further embodiment of any of the above, the airfoil includes a trailing edge portion. The cross-over rib and the row are arranged in the trailing edge portion.

In a further embodiment of any of the above, the cooling passage includes first and second cooling passageways. The cross-over rib is arranged between the first and second cooling passageways and the holes fluidly connect the first and second passageways.

In a further embodiment of any of the above, the cooling passage is tapered along the first direction from a wide end to a narrow end. The row is arranged near the narrow end, and the cross-over rib is arranged near the wide end.

In a further embodiment of any of the above, multiple cross-over ribs are spaced apart from one another in the second direction. The row is aligned in the second direction between the multiple cross-over ribs and spaced apart in the first direction.

In a further embodiment of any of the above, multiple rows are spaced apart from one another in the second direction. The cross-over rib is aligned in the second direction between the multiple rows and spaced apart in the first direction.

In a further embodiment of any of the above, the component is one of an airfoil, a blade outer air seal, a vane, a blade, a platform, a combustor liner and an exhaust liner.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
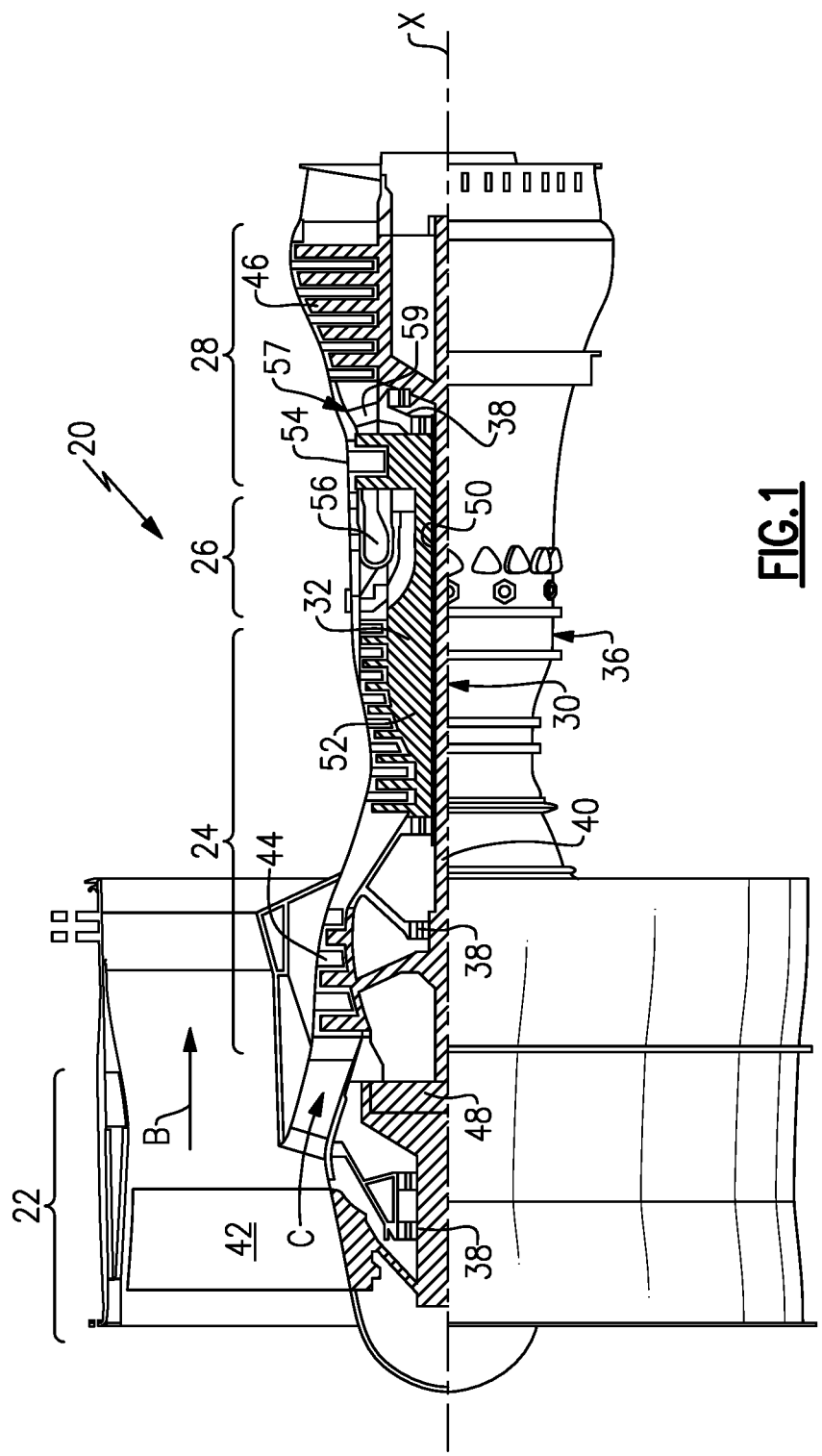
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis X, which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example a high-bypass geared aircraft engine. In a further example, the engine 20 bypass ratio is greater than about six (6), with an example embodiment being greater than ten (10). The example speed reduction device is a geared architecture 48 however other speed reducing devices such as fluid or electromechanical devices are also within the contemplation of this disclosure. The example geared architecture 48 is an epicyclic gear train, such as a star gear system or other gear system, with a gear reduction ratio of greater than about 2.3, or more specifically, a ratio of from about 2.2 to about 4.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as bucket cruise Thrust Specific Fuel Consumption ("TSFC"). TSFC is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ambient} ° R)/518.7° R)^{0.5}]$. The "low corrected fan tip speed" as disclosed herein according to one non-limiting embodiment is less than about 1150 ft/second.

The disclosed cooling passage may be used in various gas turbine engine components. For exemplary purposes, a turbine blade 64 is described. It should be understood that the cooling passage may also be used in vanes, blade outer air seals, and turbine part platforms, combustor liners, and exhaust liners, for example.

Figure 2A:
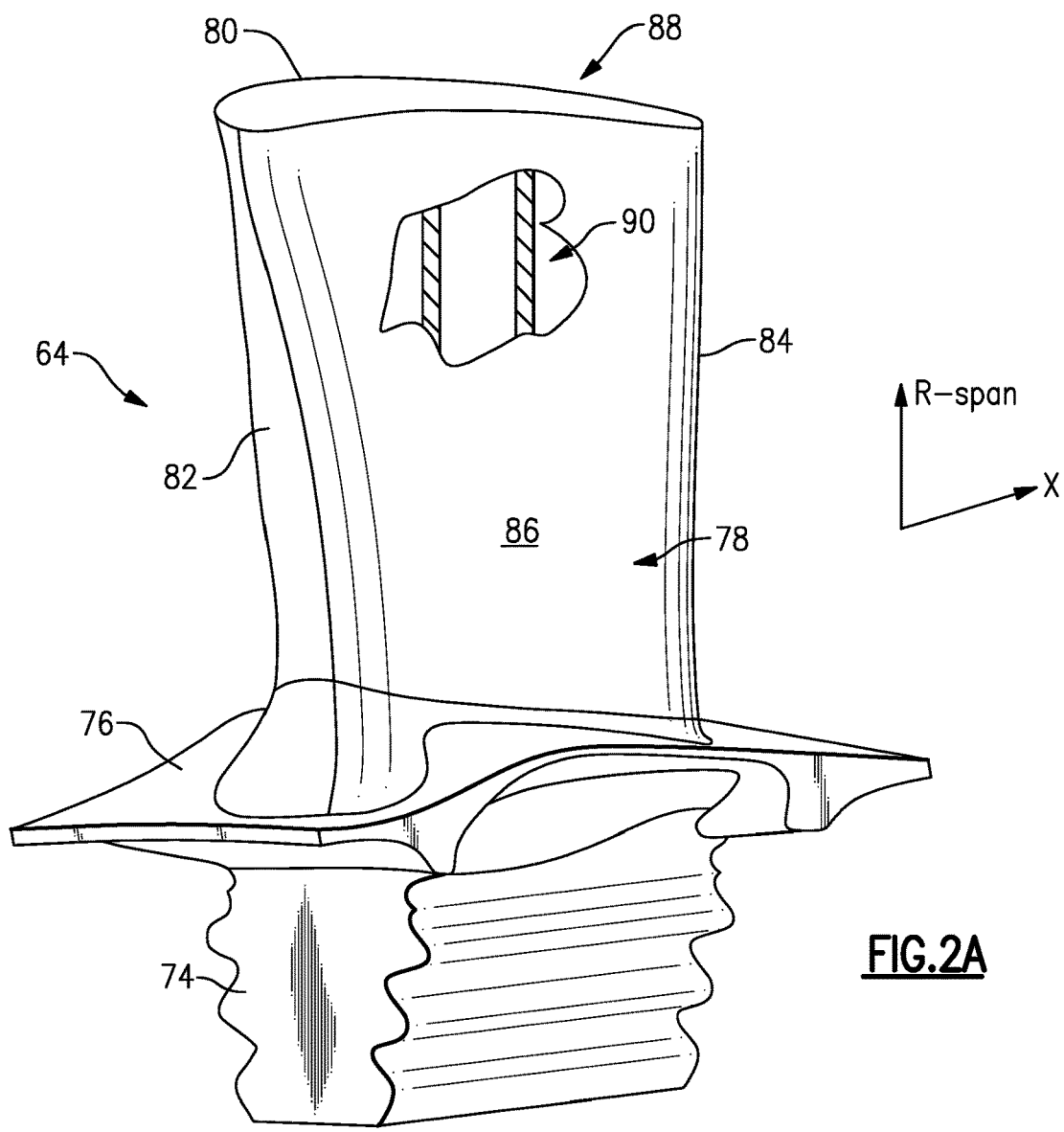
FIG. 2A is a perspective view of the airfoil having the disclosed cooling passage.
Figure 2B:
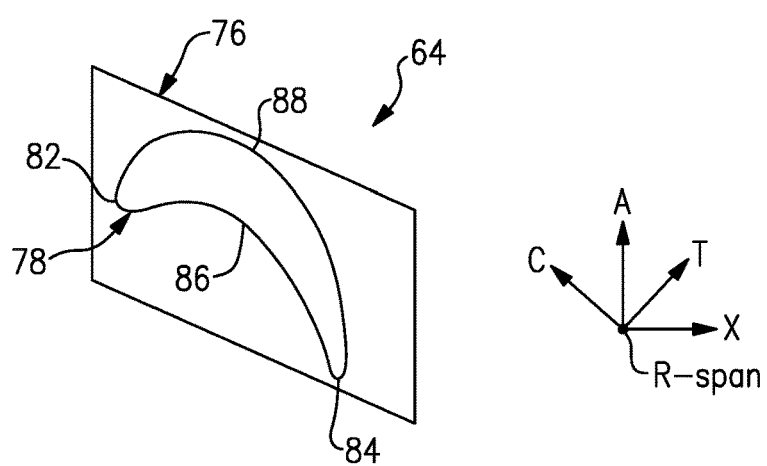
FIG. 2B is a plan view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (not shown) in fluid communication with the cooling passage 90. Flow through one portion of the cooling passage 90 illustrated in FIG. 2A is shown in more detail in FIGS. 3A and 3B.

Some airfoil designs may result in progressively thinner airfoil cross-sections at the radially outboard spans. These airfoils may be hollow to save weight and to provide cooling passages. It is desirable to structurally support the thin, hollow airfoil sections at the tip while maintaining a consistent load path to the root of the airfoil.

Figure 3A:
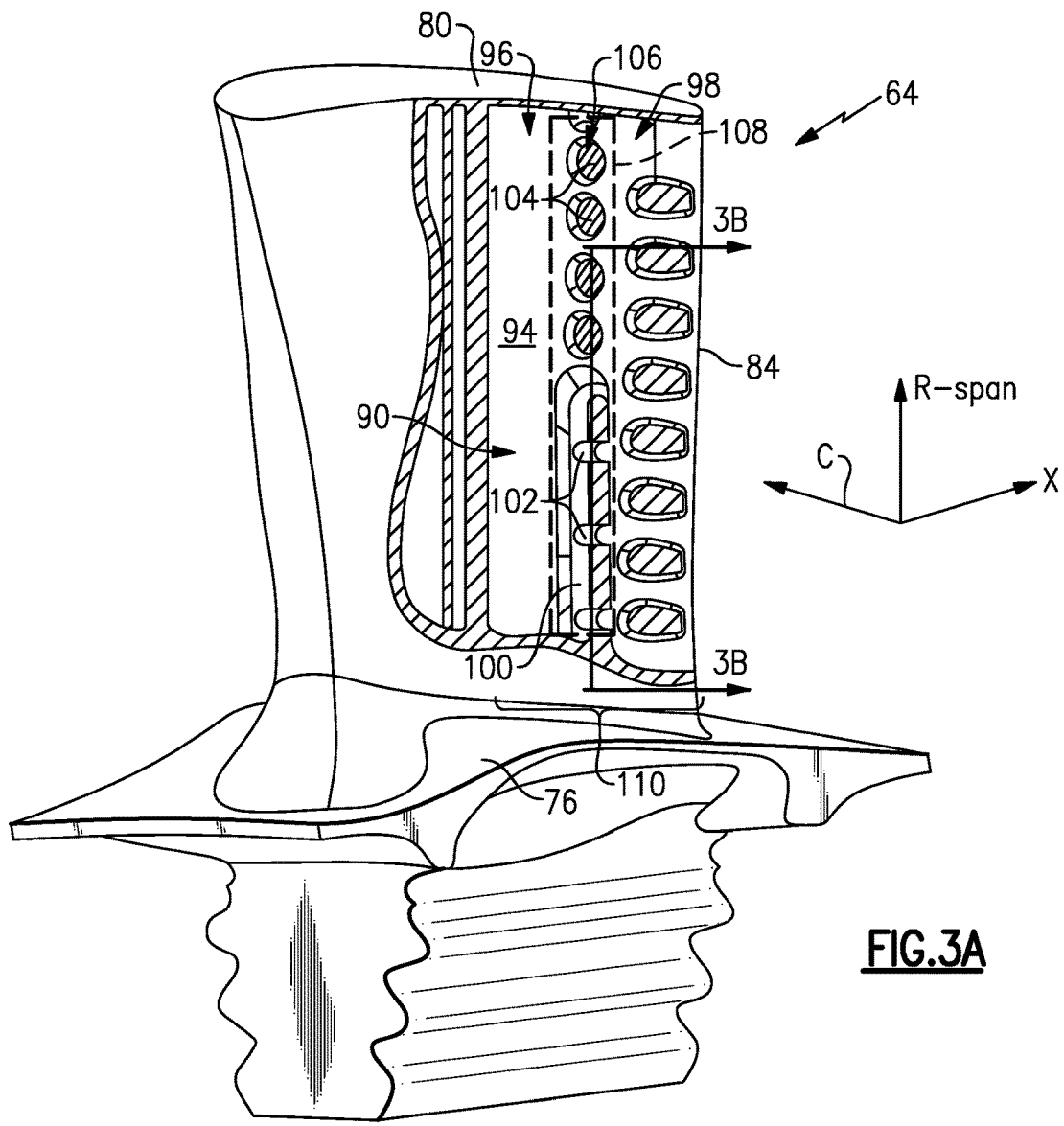
FIG. 3A is a partial cross-sectional view of one example airfoil.

Generally, according to this disclosure a combined "rib" is created that consists of both cross-over ribs 100 and pedestals 104 in the internal cooling passage 90, as shown in FIG. 3A. The cross-over ribs 100 and pedestals 104 line up to form a structural "rib" 108 while still allowing air to pass through the rib. This arrangement enables thinner airfoil sections at the tip and wider airfoil sections at the platform, for example.

Spaced apart walls 92, 94 provide the cooling passage 90 that extends in a first direction, which corresponds to the radial direction R in the example. In one example, the walls 92, 94 correspond to the pressure and suction side walls 86, 88. The cross-over rib 100 joins the walls 92, 94 and extends along the first direction a first length. The cross-over rib 100 has holes 102 extending in a second direction, which corresponds to the chord-wise direction C in the example, which is transverse to the first direction. A row 106 of pedestals 104 joins the walls 92, 94 and extends along the first direction a second length. The row 106 and the cross-over rib 100 overlap one another in the second direction. In the example shown in FIG. 3A, the cross-over rib 100 and the row 106 are aligned with one another in the second direction to provide a non-contiguous rib 108 in the first direction.

The airfoil 78 includes a trailing edge portion 110, and the cross-over rib 100 and the row 106 are arranged in the trailing edge portion 110. The cooling passage 90 includes first and second cooling passageways 96, 98. The cross-over rib 100 is arranged between the first and second cooling passageways 96, 98, and the holes 102 fluidly connect the first and second passageways 96, 98.

Figure 3B:
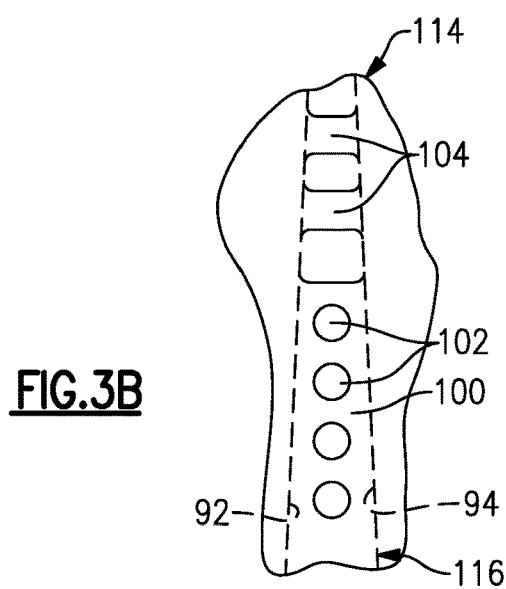
FIG. 3B is a cross-sectional view of the airfoil shown in FIG. 3A taken along line 3B-3B.

The cooling passage 90 is tapered along the first direction from a wide end 116 to a narrow end 114, as shown in FIG. 3B. The row 106 is arranged near the narrow end 114, and the cross-over 100 rib is arranged near the wide end 116. In the example of an airfoil that tapers toward the tip, the row 106 is arranged near the tip 80 and the cross-over rib 100 is arranged near the platform 76. In some cases, the order of these features may be reversed with the pedestals occupying the inner diameter portion of the rib and the cross-over ribs occupying the outer portion of the rib.

Figure 4:
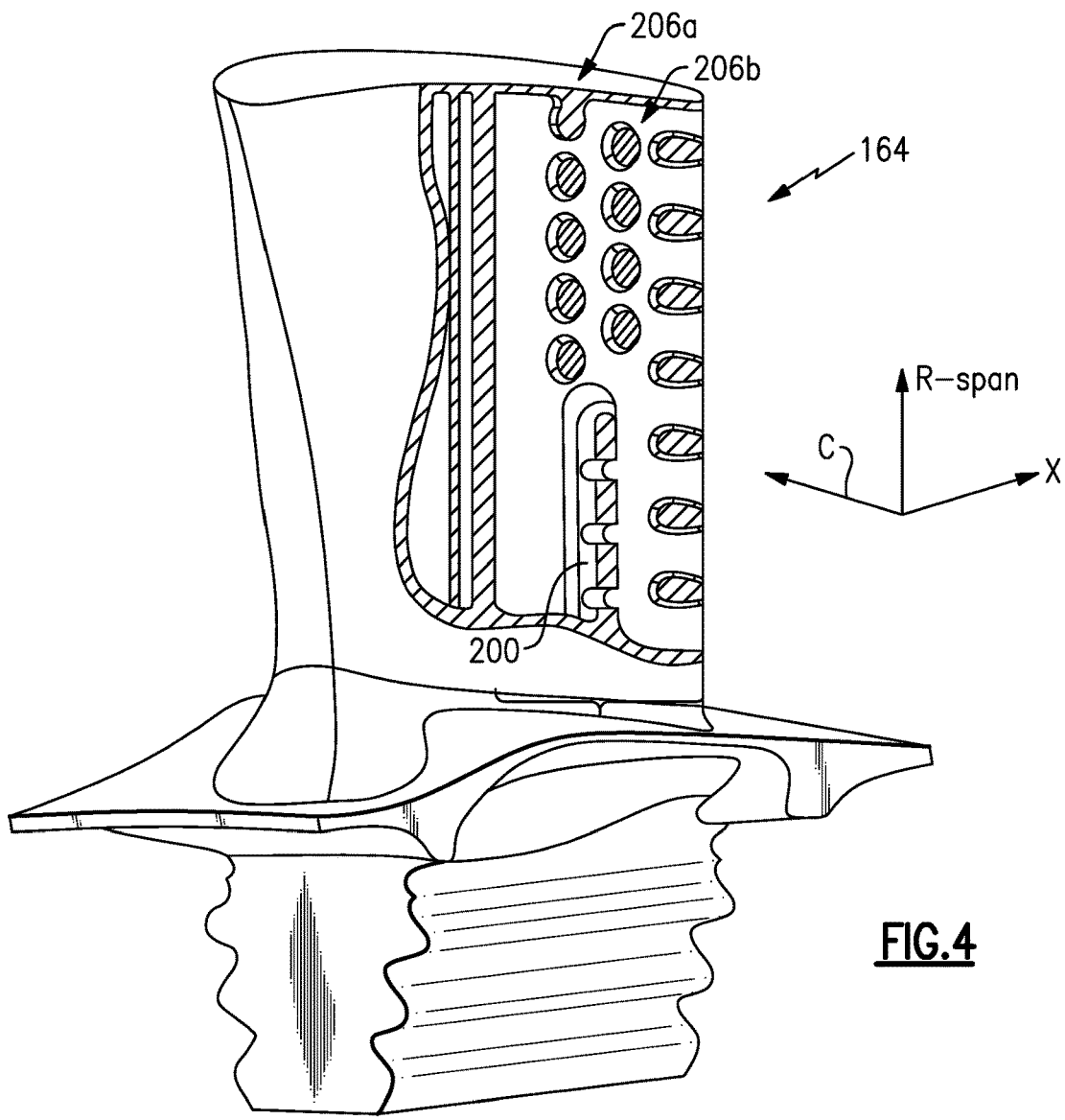
FIG. 4 is a cross-sectional view of another example airfoil.

The configuration is not limited to a single row of pedestals or cross-over ribs. An array of pedestal rows 206a, 206b, such as that shown in the blade 164 of FIG. 4, may be used. In this example, multiple rows 206a, 206b are spaced apart from one another in the second direction. The cross-over rib 200 is aligned in the second direction between the multiple rows 206a, 206b and spaced apart in the first direction.

Figure 5:
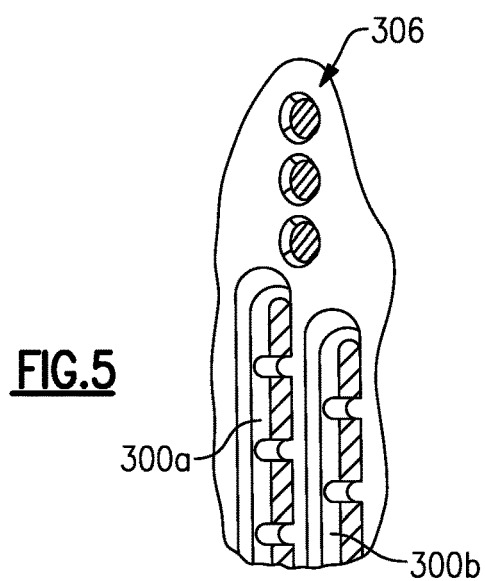
FIG. 5 is a cross-sectional view of an example cooling passage in a gas turbine engine component.

Also multiple cross-over ribs may be used, as shown in FIG. 5. A gas turbine engine component is shown with multiple cross-over ribs 300a, 300b spaced apart from one another in the second direction. The row 306 of pedestals is aligned in the second direction between the multiple cross-over ribs 300a, 300b and spaced apart in the first direction.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that and other reasons, the following claims should be studied to determine their true scope and content.

What is claimed is:

1. A gas turbine engine component comprising:
spaced apart walls providing a cooling passage that extends in a first direction, wherein the spaced apart walls are provided by pressure and suction walls that form an airfoil, the first direction corresponds to a radial direction along which the airfoil extends from a platform to a tip;
a cross-over rib joining the spaced apart walls, and the cross-over rib extending along the first direction a length, the cross-over rib having holes along the length extending in a second direction transverse to the first direction, the second direction corresponding to a chord-wise direction, wherein each of the holes include a perimeter that is spaced interiorly of the spaced apart walls such that a portion of the cross-over rib adjoins the walls along the length entirely; and
a row of rib pedestals joining the spaced apart walls and extending along the first direction, wherein adjacent rib pedestals form a space that fully extends from one of the spaced apart walls to the other of the spaced apart walls, the row of rib pedestals and the cross-over rib aligned with one another in a column in the second direction to provide a non-contiguous combined rib in the first direction, wherein the row of rib pedestals is arranged nearer the tip than the platform, and the cross-over rib is arranged nearer the platform than the tip.

2. The gas turbine engine component according to claim 1, wherein the airfoil includes a trailing edge portion, and the cross-over rib and the row of rib pedestals are arranged in the trailing edge portion.

3. The gas turbine engine component according to claim 1, wherein the cooling passage includes a first cooling passageway and a second cooling passageway, the cross-over rib arranged between the first and second cooling passageways and the holes fluidly connecting the first and second cooling passageways.

4. The gas turbine engine component according to claim 3, wherein the cooling passage is tapered along the first direction from a wide end to a narrow end, wherein the row of rib pedestals is arranged nearer the narrow end than the wide end, and the cross-over rib is arranged nearer the wide end than the narrow end.

5. The gas turbine engine component according to claim 1, comprising multiple cross-over ribs spaced apart from one another in the second direction, the row of rib pedestals aligned in the second direction between the multiple cross-over ribs, and the row of rib pedestals being spaced apart from the multiple cross-over ribs in the first direction.

6. The gas turbine engine component according to claim 1, comprising multiple rows of rib pedestals, the rib pedestals of each row spaced apart from one another in the second direction, the cross-over rib aligned in the second direction between the multiple rows of rib pedestals, and the cross-over rib spaced apart from the multiple rows in the first direction.

7. The gas turbine engine component according to claim 1, wherein the component is one of a vane or a blade.

8. A gas turbine engine component comprising:
spaced apart walls providing a cooling passage that extends in a first direction;
a cross-over rib joining the spaced apart walls, and the cross-over rib extending along the first direction over a length, the cross-over rib having holes distributed over the length and extending in a second direction transverse to the first direction, wherein the spaced apart walls are provided by pressure and suction walls that form an airfoil, the first direction corresponds to a radial direction along which the airfoil extends from a platform to a tip, and the second direction corresponds to a chord-wise direction, wherein each of the holes include a perimeter that is spaced interiorly of the spaced apart walls such that a portion of the cross-over rib adjoins the spaced apart walls along the length entirely, wherein the cooling passage includes a first cooling passageway and a second cooling passageway, the cross-over rib arranged between the first and second cooling passageways and the holes fluidly connecting the first and second cooling passageways;
a row of rib pedestals joining the spaced apart walls and extending along the first direction, wherein adjacent rib pedestals form a space that fully extends from one of the spaced apart walls to the other of the spaced apart walls, the row and the cross-over rib overlapping one another in the second direction, wherein the row is arranged nearer the tip than the platform, and the cross-over rib is arranged nearer the platform than the tip;
wherein the airfoil includes a trailing edge portion having a trailing edge, and the cross-over rib and the row are arranged in the trailing edge portion; and
wherein trailing edge pedestals are arranged between the row of rib pedestals and the trailing edge.

9. The gas turbine engine component according to claim 8, comprising multiple cross-over ribs spaced apart from one another in the second direction, the row being aligned in the second direction between the multiple cross-over ribs, and the row being spaced apart from the multiple cross-over ribs in the first direction.

10. The gas turbine engine component according to claim 8, comprising multiple rows of rib pedestals, the rib pedestals of each row spaced apart from one another in the second direction, the cross-over rib aligned in the second direction between the multiple rows of rib pedestals, and the cross-over rib spaced apart from the multiple rows of rib pedestals in the first direction.

11. The gas turbine engine component according to claim 8, wherein the component is one of a vane or a blade.

12. A gas turbine engine component comprising:
spaced apart walls providing a cooling passage that extends in a first direction;
a cross-over rib joining the spaced apart walls, and the cross-over rib extending along the first direction over a length, the cross-over rib having holes distributed over the length and extending in a second direction transverse to the first direction, wherein the spaced apart walls are provided by pressure and suction walls that form an airfoil, the first direction corresponds to a radial direction along which the airfoil extends from a platform to a tip, and the second direction corresponds to a chord-wise direction, wherein each of the holes include a perimeter that is spaced interiorly of the spaced apart walls such that a portion of the cross-over rib adjoins the spaced apart walls along the length entirely;
a row of at least one pedestal joining the spaced apart walls and extending along the first direction, wherein adjacent rib pedestals form a space that fully extends from one of the spaced apart walls to the other of the spaced apart walls, the row and the cross-over rib overlapping one another in the second direction, wherein the row of rib pedestals is arranged nearer the tip than the platform, and the cross-over rib is arranged nearer the platform than the tip, wherein the cooling passage is tapered along the first direction from a wide end at the platform to a narrow end at the tip, wherein the row of rib pedestals is arranged nearer the narrow end than the wide end, and the cross-over rib is arranged nearer the wide end than the narrow end;
wherein the airfoil includes a trailing edge portion having a trailing edge, and the cross-over rib and the row are arranged in the trailing edge portion; and
wherein trailing edge pedestals being are arranged between the row of rib pedestals and the trailing edge.

* * * * *